United States Patent [19]

Amano et al.

[11] Patent Number: 4,592,621

[45] Date of Patent: Jun. 3, 1986

[54] ACOUSTOOPTIC MODULATION ELEMENT AND SYSTEM FOR ACOUSTOOPTICALLY CARRYING OUT MODULATION OF A PLURALITY OF PARALLEL BEAMS BY THE USE OF A SINGLE ACOUSTOOPTIC MEDIUM

[75] Inventors: Satoru Amano, Nirasaki; Shigenori Horiuchi; Takeru Shinohara, both of Yamanashi, all of Japan

[73] Assignee: Hoya Corporation, Tokyo, Japan

[21] Appl. No.: 517,346

[22] Filed: Jul. 26, 1983

[30] Foreign Application Priority Data

| Jul. 27, 1982 | [JP] | Japan | 57-129656 |
| Jul. 27, 1982 | [JP] | Japan | 57-129657 |
| Jul. 27, 1982 | [JP] | Japan | 57-129658 |
| Jul. 27, 1982 | [JP] | Japan | 57-129659 |

[51] Int. Cl.[4] ................................................. G02F 1/33
[52] U.S. Cl. ...................................... 350/358; 350/371
[58] Field of Search ................................ 350/358, 371

[56] References Cited

U.S. PATENT DOCUMENTS

| 3,602,725 | 8/1971 | DeMaria | 350/358 |
| 3,759,603 | 9/1973 | Eschler | 350/358 |
| 3,891,308 | 6/1975 | Hawkins | 350/358 |
| 4,348,075 | 9/1982 | Gottlieb et al. | 350/358 |
| 4,516,838 | 5/1985 | Bademian | 350/392 |

Primary Examiner—John K. Corbin
Assistant Examiner—Bruce S. Shapiro
Attorney, Agent, or Firm—Roberts Spiecens Cohen

[57] ABSTRACT

Responsive to a plurality of parallel light beams and electric signals corresponding to the parallel light beams, an acoustic modulation element produces output light beams modulated by acoustic waves resulting from the electric signals. The element comprises a single acoustooptic medium block receiving the parallel beams on a first surface thereof and emitting the output light beams from a second surface opposite to the first surface. A plurality of transducer units are laid in parallel on a third surface of the block between the first and the second surfaces along the respective parallel beams so as to propagate the acoustic waves into the block when activated by the electric signals. The block may have a fourth surface opposite to the third surface and arcuately or triangularly recessed towards the third surface. Preferably, the transducer units are mounted on plateaus isolated from each other by a channel formed between two adjacent ones of the plateaus, in order to avoid interferences of the acoustic waves. The element is for use in combination with a beam splitter member for producing the parallel beams in response to a single light beam.

5 Claims, 8 Drawing Figures

ACOUSTOOPTIC MODULATION ELEMENT AND SYSTEM FOR ACOUSTOOPTICALLY CARRYING OUT MODULATION OF A PLURALITY OF PARALLEL BEAMS BY THE USE OF A SINGLE ACOUSTOOPTIC MEDIUM

BACKGROUND OF THE INVENTION

This invention relates to an acoustooptic modulation element for use in acoustooptically modulating a light beam by an acoustic wave and to an acoustooptic modulation system comprising such an acoustooptic modulation element.

A conventional acoustooptic modulation element of the type described comprises an acoustooptic medium for acoustooptically modulating a single incident light beam by an acoustic wave. More particularly, the acoustooptic medium has a first surface for the incident light beam, a second surface parallel to the first surface, and a third surface between the first and the second surfaces. A transducer is attached to the third surface so as transduce an electric signal into the acoustic wave. When the electric signal has a plurality of frequency components different from one another, the incident light beam which is admitted through the first surface is modulated into a plurality of output light beams by the acoustic wave resulting from the electric signal. The output light beams are emitted through the second surface in directions dependent on the frequency components of the electric signal, as well known in the art. Each of the output light beams is recorded or printed on a recording medium in a known manner.

With the acoustooptic modulation element, the number of the output light beams is determined by the number of the frequency components. This means that each output light beam becomes weaker in intensity with an increase of the frequency components. Accordingly, the intensity of each output light beam fluctuates with the number of the frequency components included in the electric signal. Such fluctuation of each output light beam brings about unevenness of printing and inevitably deteriorates the quality of printing.

Another conventional acoustooptic modulation system comprises a beam splitter in combination with a plurality of acoustooptic modulation elements. With this system, the beam splitter splits the incident light beam into a plurality of split light beams so as to supply the acoustooptic modulation elements with the split light beams, respectively. Accordingly, each of the acoustooptic modulation elements individually modulates each split beam by an acoustic wave resulting from an electric signal. As a result, a single modulated light beam is emitted from each acoustic modulation element in a direction dependent on each electric signal.

In order to produce a plurality of modulated light beams by the use of the above-mentioned system, a plurality of acoutooptic modulation elements should be arranged in parallel. The system therefore becomes bulky in structure. In addition, the acoustooptic modulation elements should individually be adjusted to the respective split light beams emitted from the beam splitter. Such individual adjustment is very troublesome.

SUMMARY OF THE INVENTION

It is an object of this invention to provide an acoustooptic modulation element which is capable of modulating a plurality of input light beams without any fluctuation of intensities.

It is another object of this invention to provide an acoustooptic modulation element of the type described, which is compact in structure.

It is a further object of this invention to provide an acoustooptic modulation system which can readily be adjusted to each of split beams emitted from a beam splitter.

An acoustooptic modulation element according to this invention is capable of responding to a plurality of input light beams substantially parallel to one another and electric signals equal in number to said input light beams for producing output light beams, respectively. The acoustooptic modulation element comprises a single acoustooptic medium block having a first surface for the input light beams, a second surface for the output light beams, a third surface contiguous to the first and the second surfaces, and a fourth surface contiguous to the first and the second surfaces and opposite to the third surface and transducing means attached to the third surface and responsive to the electric signals for transducing the electric signals into acoustic waves to produce through the second surface the output light beams modulated by the acoustic waves when the electric signals are given to the transducing means.

DESCRIPTION OF THE PREFERRED EMBODIMENTS

Figure 1:
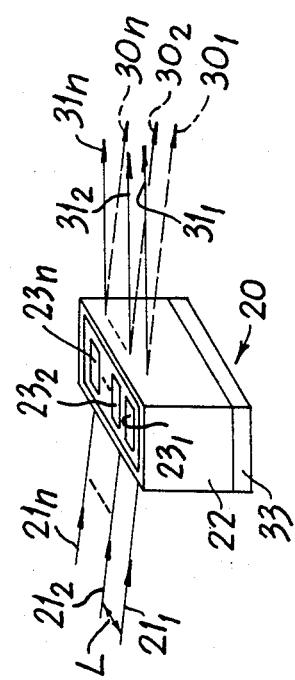
FIG. 1 schematically shows a perspective view of an acoustooptic modulation element according to a first embodiment of this invention.

Referring to FIG. 1, an acoustooptic modulation element 20 according to a first embodiment of this invention is supplied with first through n-th input light beams $21_1, 21_2, \ldots, 21_n$ substantially parallel to one another with a distance L between adjacent incident light beams. The acoustooptic modulation element 20 comprises a single block 22 of an acoustooptic medium, such as a single crystal of tellurium dioxide, a single crystal of lead molybdate, optical glass, or the like. The block 22 is a parallelpiped of 20 mm×20 mm×10 mm, by way of example, and has a first surface directed leftwards in FIG. 1, a second surface directed rightwards therein, and third and fourth surfaces directed upwards and downwards, respectively. Each of the third and the fourth surfaces are opposite to the other and contiguous to the first and the second surfaces.

Each of the input light beams $21_1$ to $21_n$ is incident on the first surface in parallel along an optical axis thereof.

A transducer member is attached to the third surface and is supplied with first through n-th electric signals which are in one-to-one correspondence to the input light beams $21_1$ through $21_n$. When activated by the electric signals, the transducer member produces acoustic waves, namely, ultrasonic waves, respectively. The transducer member is divided into first through n-th transducer units $23_1$ to $23_n$ individually operable in response to the first through the n-th electric signals. The first through the n-th transducer units $23_1$ to $23_n$ extent in parallel along the respective input light beams $21_1$ to $21_n$ on the third surface to individually propagate the acoustic waves into the block 22.

Figure 2:
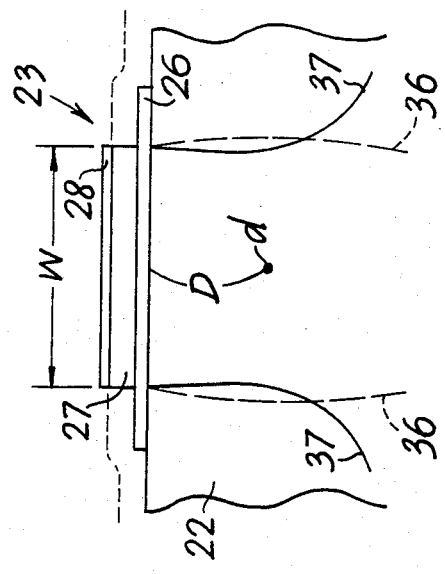
FIG. 2 shows an enlarged and fragmentary front view of the acoustooptic modulation element illustrated in FIG. 1.

Referring to FIG. 2 (which is a front view of the first surface in FIG. 1) together with FIG. 1, each of the first through the n-th transducer units $23_1$ to $23_n$ comprises a first electrode 26, a transducer medium 27, and a second electrode 28 which are successively stacked on the third surface. The transducer medium 27 may be common to all of the first to the n-th transducer units $23_1$ to $23_n$, as suggested by a broken line in FIG. 2, and may be, for example, a 36° Y cut plate made of a single crystal of lithium niobate. The first electrodes 26 each have a first electrode width in a direction transverse to each input light beam and are spaced from an adjacent first electrode. The second electrode 28 may have a second electrode width W somewhat less than that of the first electrode 26, as shown in FIG. 2. A pair of first and the second electrodes 26 and 28 are electrically isolated from the remaining electrode pairs and are individually supplied with each of the electric signals.

Each of the input light beams 21 (suffixes omitted) is incident on the first surface at the Bragg angle in an incident position and passes through the block 22. As shown in FIG. 2, the incident position is present on a center line of the second electrode 28 and has a depth D from the third surface. The depth D is, for example, 1 mm. Assume that each of the input light beams has a spot size d.

When no electric signal is supplied across the first and the second electrodes 26 and 28, each of the first through the n-th input light beams $21_1$ to $21_n$ is not subjected to any modulation and is sent from the second surface along the optical axis of each input light beam each in the form of zeroth-order light beams $30_1, 30_2, \ldots, 30_n$ shown by broken lines in FIG. 1.

Each of the acoustic or ultrasonic waves is propagated from each transducer unit 23 to the block 22 towards the fourth surface by supply of each of the electric signals which are previously subjected to amplitude modulation in a known manner. As a result, each input light beam 21 is subjected to modulation by each of the acoustic waves to produce first through n-th output light beams. Each of the first through the n-th output light beamsincludes a first-order diffracted light beam (shown by each solid line $31_1, 31_2, \ldots, 31_n$ in FIG. 1) in addition to the zeroth-order light beam 30. Such a first-order light beam 31 is sent to a printer (not shown) to be recorded on a recording medium.

With this structure, the acoustic waves are internally reflected from the fourth surface. Such reflection adversely affects modulation of each input light beam. In order to avoid the reflection from the fourth surface, an acoustic absorber 33 is attached to the fourth surface. The absorber 33 may be of lead or the like.

Thus, a plurality of parallel light beams substantially parallel to one another can be modulated by the use of a single acoustooptic modulation element.

Further referring to FIG. 2, consideration is made regarding that directivity of each acoustic wave which is specified by velocity potential whose gradient to equal to the velocity of the acoustic wave, as known in the art. It is generally pointed out that the velocity potential of the acoustic wave does not diverge within the acoustooptic medium block 22, as shown by broken lines 36 in FIG. 2, on condition that the block 22 and the transducer unit 23 are surrounded by a rigid body.

According to the inventor's experimental studies, it has, however, been found that the velocity potential of the acoustic wave objectionably diverges within the acoustooptic medium block 22, as shown by solid lines 37 in FIG. 2, if the above-mentioned condition is not satisfied.

It is assumed in the illustrated acoustooptic modulation element that the distance L is less than five times the width W of the second electrode 28 and that one of the two adjacent light beams is modulated by an acoustic wave with the other unmodulated by any acoustic wave. For brevity of description, a combination of the input and the output light beams may be simply called a light beam, as long as any confusion does not arise between them. Assume two adjacent light beams are selected from the first through the n-th light beams and are designated as an m-th and an (m+1)-th light beams, respectively. Under the circumstances, it has been observed that the (m+1)-th light beam is accompanied by a spurious first-order diffracted component resulting from modulation of the m-th light beam and that an on-off ratio, namely, an extinction ratio is reduced by the spurious first-order diffracted component.

Such a spurious component results from the divergence of the velocity potential of each acoustic wave. Therefore, the distance L must be greater than five times the width W of the second electrode 28 in order to completely suppress any adverse influence on the adjacent light beams. As a result, the illustrated element 20 inevitably becomes bulky in structure.

Figure 3:
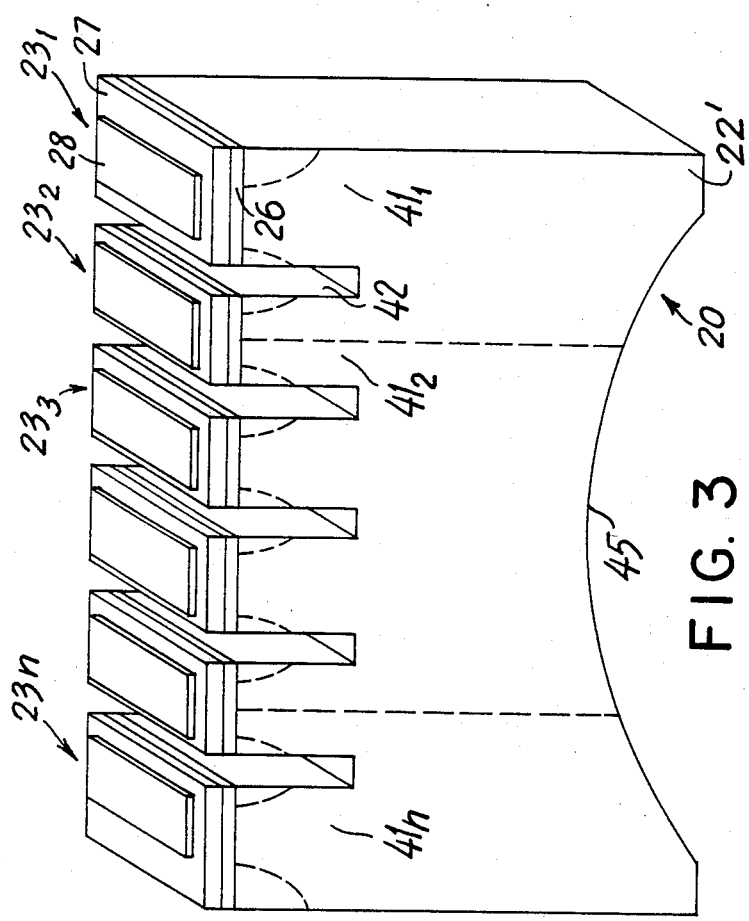
FIG. 3 schematically shows a perspective view of an acoustooptic modulation element according to a second embodiment of this invention.

Referring to FIG. 3, an acoustooptic modulation element 20 according to a second embodiment of this invention comprises similar parts designated by like reference numerals. As in FIG. 1, an acoustooptic medium block 22' has a first or a front surface at the front in this figure, a second or a back surface substantially parallel to the first surface and opposite to the first surface, and third and fourth surfaces directed upwards and downwards, respectively.

As shown in FIG. 3, the block 22' has first through n-th plateaus $41_1$ to $41_n$ separated from one another by channels 42 extending in parallel between the first and the second surfaces. Each plateau 41 has a top surface providing a part of the third surface. In other words, the totality of the top surfaces defines the third surface. Each of the channels 42 is defined by a pair of internal side surfaces contiguous to the first through the third surfaces and a recessed surface recessed from the third surface and contiguous to the internal side surfaces.

The input light beams are incident on the first surface of the respective plateaus $41_1$ to $41_n$ while the output light beams appear on the second surface of the respective plateaus. Each channel has a depth equal to or greater than the depth D of the incident position illustrated in FIG. 2 and a width of, for example, 0.5 mm. The width of the channel is determined by the thickness of a wire saw used to form the channels 42.

The first through the n-th transducer units $23_1$ to $23_n$ are attached to the first through the n-th plateaus $41_1$ to $41_n$ on the top surfaces thereof, respectively. Each of the first through the n-th transducers $23_1$ to $23_n$ comprises the first electrode 26, the transducer mediums 27, and the second electrode 28 which are successively stacked on the top surfaces, as in FIG. 2. Also as in FIG. 2, assume each second electrode 28 has a second electrode width represented by W and is somewhat narrower than the first electrode 26. The second electrode width W, the beam distance L (shown in FIG. 1), and the depth D of the incident position (shown in FIG. 2) are, for example, 0.7 mm, 1.5 mm, and 1 mm, respectively.

Further referring to FIG. 3, in its block 22' has the fourth surface an arcuately recessed portion 45 recessed towards the third surface. the arcuately recessed portion 45 extends between the first and the second surfaces. The arcuately recessed portion is nearest to the third surface in a center region of each of the first and the second surfaces (shown in dotted lines) and gradually extends away from the third surface in end regions on both sides of the center region.

Such an arcuately recessed portion serves to reflect each acoustic wave in various directions. Therefore, each acoustic wave is not substantially returned back to each of the transducer units. It is therefore possible to avoid interference between the acoustic waves. An acoustic absorber as illustrated in FIG. 1 may be attached to the arcuately recessed portion 45 and may be placed on the internal side surfaces and the recessed surfaces.

Figure 4:
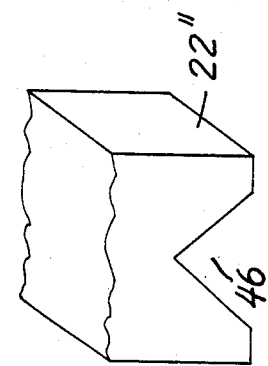
FIG. 4 partially shows a perspective view of another acoustooptic modulation element according to a modification.

Referring to FIG. 4, the illustrated block 22" has a chevron shaped portion, namely, a triangularly recessed portion 46 on the fourth surface. The triangularly recessed portion 46 is recessed towards the third surface and is nearest to the third surface in the center region. It is possible with this structure to avoid interference between the acoustic waves.

Figure 5:
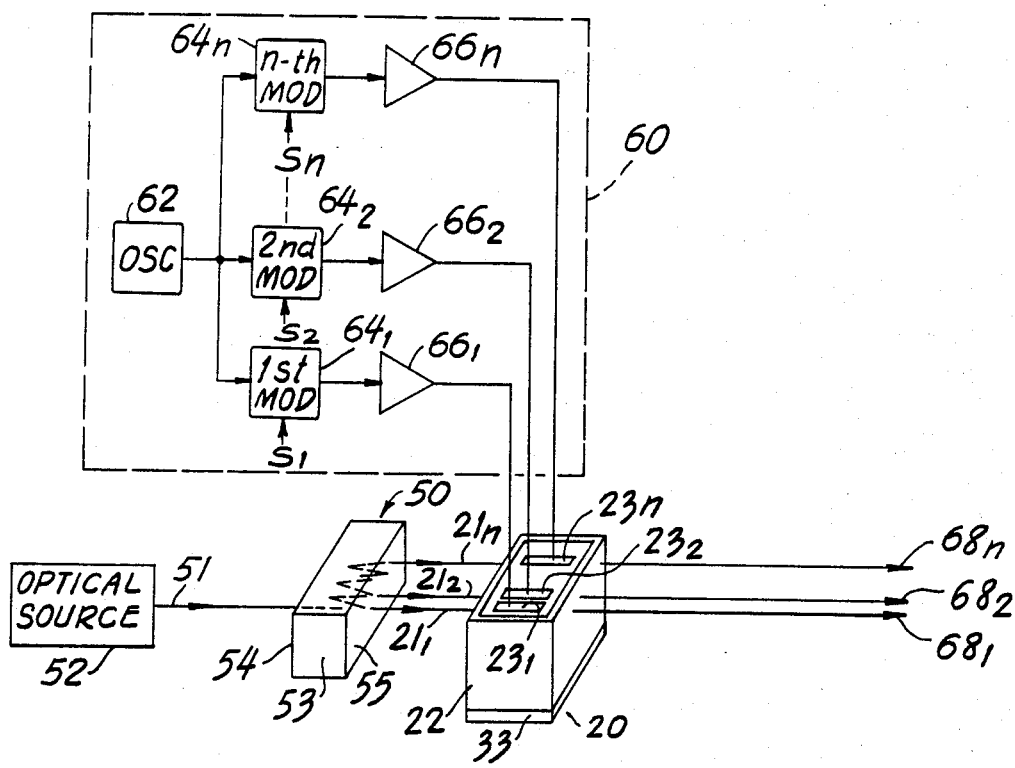
FIG. 5 diagrammatically shows a view of an acoustooptic modulation system according to an embodiment of this invention.

Referring to FIG. 5, an acoustooptic modulation system according to a third embodiment of this invention comprises the acoustooptic modulation element 20 illustrated in FIG. 1. The system comprises a beam splitter 50 responsive to an incident light beam 51 for supplying the acoustooptic modulation element 20 with first through n-th split beams as the input light beams $21_1, 21_2, \ldots, 21_n$ illustrated with reference to FIG. 1, respectively. The split beams are emitted from the beam splitter 50 in parallel. The incident light beam 51 can be produced from an argon laser as an optical source 52 and have a wavelength of 488 nm.

Figure 6:
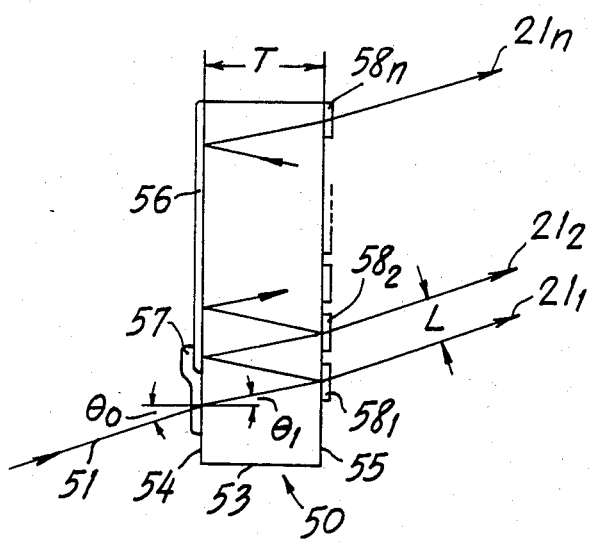
FIG. 6 shows a top view of a beam splitter for use in the acoustic modulation system illustrated in FIG. 5.

Referring to FIG. 6 together with FIG. 5, the beam splitter 50 comprises a body 53 of quartz transparent to the incident light beam 51 and having a thickness T and front and back surfaces 54 and 55 substantially parallel to each other. The incident light beam 51 is incident on the front surface 54 at an incident portion. The front surface is coated with a reflection layer 56 except for the incident portion. The incident portion is covered with an anti-reflection layer 57 with a part of the anti-reflection layer 57 superposed on the reflection layer 56.

The back surface 55 is divided transversely of the incident light beam 51 into a plurality of areas which are equal in number to n and which are therefore called first through n-th areas, respectively. Each of the first through the n-th areas is partially coated with each of first through n-th layers $58_1, 58_2, \ldots, 58_n$ having reflectivities gradually reduced from the first layer $58_1$ to the n-th layer $58_n$. Such a reduction of the reflectivities is for emitting the first through the n-th split beams substantially equal in intensity to one another, as will later become clear, and for partially reflecting light beams internally incident on the first through the (n−1)-th layers. For this purpose, the first through the (n−1)-th layers $58_1$ to $58_{n-1}$ may be semi-transparent or translucent and the n-th layer $58_n$ may be transparent. The first through the n-th areas may be completely or wholly covered with the first through the n-th layers $58_1$ to $58_n$, respectively.

As shown in FIG. 6, the incident light beam 51 is applied to the incident portion on the front surface at a predetermined incident angle $\theta_0$ and is transmitted towards the back surface. In this event, the incident light beam 51 is reflected at an angle $\theta_1$ of refraction. An internally incident light beam on the first layer $58_1$ is partially transmitted through the first layer $58_1$ and partially internally reflected towards the reflection layer 56. The reflection layer 56 internally reflects a light beam internally incident thereon towards the second layer $58_2$. Similar operation is repeated between the second through the (n−1)-th layers $58_2$ to $58_{n-1}$ and the reflection layer 56. Finally, the n-th split beam is emitted from the n-th layer $58_n$.

It should be recalled that the acoustooptic modulation element 20 illustrated in FIG. 1 is supplied with the input light beams $21_1$ to $21_n$ with the distance left between two adjacent ones of the input light beams $21_1$ to $21_n$. Accordingly, it is preferable that the distance $L_1$ of the first through the n-th split beams is equal to the distance L between two adjacent ones of the input light beams.

Inasmuch as the distance $L_1$ between two adjacent split beams is calculated by:

$$L_1 = 2T\sin\theta_1, \quad (1)$$

and $\sin\theta_1$ is given in accordance with Snell's law by:

$$\sin\theta_1 = \sin\theta_0/n_0 \quad (2)$$

where $n_0$ is representative of the refractive index of the body 50.

Substitution of Equation (2) into Equation (1) gives:

$$L_1 = (2T/n_0)\sin\theta_0. \quad (3)$$

Thus, the distance $L_1$ between two adjacent split beams can be determined by selecting the thickness T, the refractive index $n_0$, and the incident angle $\theta_0$.

Taking the above into consideration, the reflection layer 56, the anti-reflection layer 57 and the first through the n-th layers $58_1$ to $58_n$ are properly arranged on the first and the second surfaces.

Each of the reflection layer 56, the anti-reflection layer 57, and the first through the n-th layers $58_1$ to $58_n$ can be formed by stacking a plurality of dielectric films. More particularly, the reflection layer 56 has a thickness different from those of the anti-reflection layer 57 and the first through the n-th layers $58_1$ to $58_n$. The anti-reflection layer 57 also has a thickness different from those of the first through the n-th layers $58_1$ to $58_n$. The reflection layer 56, the anti-reflection layer 57, and the first through the n-th layers $58_1$ to $58_n$ can be obtained by individually changing the number of the dielectric films, as known in the art.

As mentioned before, the reflectivities of the first through the n-th layers $58_1$ to $58_n$ are selected so that each of the first through the n-th split beams becomes substantially equal in intensity to the remaining split beams. Let the reflectivities of the first through the n-th layers $58_1$ to $58_n$ be $R_1, R_2, \ldots, R_n$, respectively. It is assumed that the reflectivity of the reflection layer 56 and internal absorption of the body 50 are equal to 1 and 0, respectively. In order to render the intensities of the split beams equal to one another, the reflectivities $R_1$ to $R_n$ should have relationships given by:

$$(1-R_1)=(1-R_2)R_1=(1-R_3)R_1R_2=(1-R_n)R_1R_2 = (1-R_n)R_2 R_{n-1}. \quad (4)$$

It is readily possible to form, by known technique, the first through the n-th layers $58_1$ to $58_n$ so that Equation (4) holds.

Thus, the illustrated beam splitter can emit from the back surface, split beams substantially equal in intensity to one another. In addition, the split beams are substantially parallel to one another and sent from the beam splitter as the first through the n-th input light beams $21_1$ to $21_n$ to the acoustooptic modulation element 20.

Referring back to FIG. 5, the acoustooptic modulation element 20 comprises the first through the n-th transducer units $23_1$ to $23_n$ attached to the third surface of the acoustooptic medium block 22, as is the case with FIG. 1. The first through the n-th transducer units $23_1$ to $23_n$ are activated by first through n-th electric signals supplied from an electric circuit 60, respectively.

The electric circuit 60 comprises an oscillator 62 generating an oscillation signal of 80 MHz. The oscillation signal is delivered to first through n-th modulators $64_1$ to $64_n$ supplied with first through n-th modulation signals $S_1$ to $S_n$ from external signal sources (not shown), respectively. The first through the n-th modulators $64_1$ to $64_n$ carry out amplitude modulation to produce first through n-th amplitude modulated signals, respectively. The first through the n-th amplitude modulated signals are supplied through amplifiers $66_1$ to $66_n$ as the first through the n-th electric signals to the first through the n-th transducer units $23_1$ to $23_n$, respectively.

The acoustooptic modulation element 20 individually modulates the first through the n-th input light beams $21_1$ to $21_n$ by the acoustic waves propagated from the first through the n-th transducer units $23_1$ to $23_n$ in the manner described in conjunction with FIGS. 1 and 2. As a result, the first through the n-th output light beams depicted at $68_1$ to $68_n$ in FIG. 5 are emitted from the acoustooptic modulation element 20.

The acoustooptic modulation element 20 illustrated in FIG. 3 may be substituted for the element 20 illustrated in FIG. 5.

Figure 7:
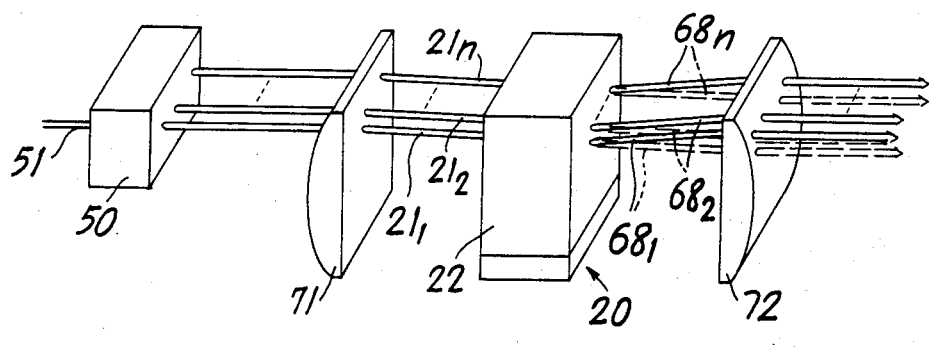
FIG. 7 diagrammatically shows a perspective view of a system according to another modification.

Referring to FIG. 7, the acoustooptic modulation element 20 is for use in combination with first and second optical systems 71 and 72 opposite to the first and the second surfaces of the element 20 with spacings left between the first optical system 71 and the first surface and between the second optical system 72 and the second surface, respectively. Each of the first and the second optical systems may be a cylindrical lens, an elliptic lens, or a spherical lens. The first through the n-th split beams emitted from the beam splitter 50 are sharpened or reduced in spot sizes through the first optical system 71 to be given as the first through the n-th input light beams $21_1$ to $21_n$. Likewise, each of the first through the n-th output light beams $68_1$ to $68_n$ is sharpened by the second optical system 72.

In general, an acoustooptic modulation element has a modulation bandwidth inversely proportional to spot sizes of each input light beam.

Accordingly, the first and the second optical systems 71 and 72 serve to widen the modulation bandwidth of the acoustooptic modulation element 20 by reducing the spot sizes of the input light beams $21_1$ to $21_n$.

Figure 8:
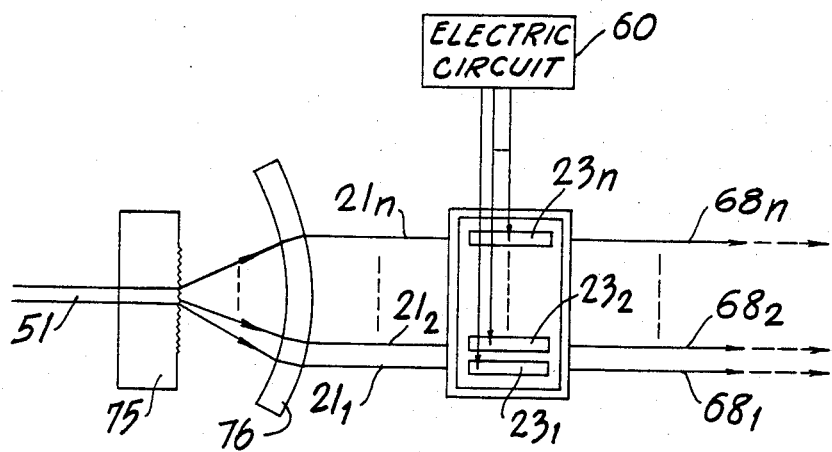
FIG. 8 diagrammatically shows a view of another acoustooptic modulation system according to a further modification.

Referring to FIG. 8, an acoustooptic modulation system according to a modification of this invention is similar to that illustrated in FIG. 5 except that a combination of a grating 75 and an elliptic lens 76 is substituted for the beam splitter 50 illustrated in FIG. 5. The grating 75 is made of optical glass and has slits of 12,000/inch and a lattice constant of 21,000 angstroms. As well known in the art, the incident light beam 51 is diffracted in directions determined by the grating 75. As a result, a plurality of diffracted light beams which are equal in number to n are rendered parallel to one another through the elliptic lens 76 and are thereafter sent as the first through the n-th input light beams $21_1$ to $21_n$ to the acoustooptic modulation element 20. Each of the first through the n-th input light beams $21_1$ to $21_n$ is subjected in the acoustooptic modulation element 20 to modulation in cooperation with the electric circuit 60 in the manner described in conjunction with FIG. 5. The combination of the grating 75 and the elliptic lens 76 may be called a beam splitter member. The grating 75 may be of a transmission type or a reflection type.

A fiber grating may be substituted for the grating 75. Such a fiber grating is known in the art and comprises a plurality of optical fibers arranged in parallel with slits left between two adjacent ones of the optical fibers.

While this invention has thus far been described in conjunction with a few embodiments thereof, it will readily be possible for those skilled in the art to put this invention into practice in various manners. For example, the first and the second optical systems 71 and 72 illustrated in FIG. 7 may be used in the system shown in FIG. 8.

What is claimed is:

1. An acoustooptic modulation element responsive to a plurality of input light beams extending substantially parallel to one another and to electric signals equal in number to said input light beams for emitting output light beams, respectively, said acoustooptic modulation element comprising:

a single acoustooptic medium block having a first surface, a second surface opposite said first surface, and a plurality of plateaus which are equal in number to said input light beams and which are arranged in parallel between said first and said second surfaces so that a channel is left between two adjacent plateaus, each of said input light beams being incident on one of said plateaus at said first surface while said output light beams exit from said plateaus at said second surface;

a plurality of transducing means each of which is mounted on one of said plateaus extending between said first and said second surfaces in the travel direction of said input light beams and each of which is responsive to one of said electric signals, for individually transducing each said electric signals into an acoustic wave which is propagated into one of said plateaus to cause the output light beams at said second surface to be modulated by said acoustic waves when said electric signals are applied to the respective transducing means.

2. An acoustooptic modulation element as claimed in claim 1, wherein said acoustooptic medium block has a recessed surface opposite said plateaus and contiguous with said first and said second surfaces, said recessed surface being recessed towards said plateaus.

3. An acoustooptic medulation element as claimed in claim 2, said block being divided into a center portion and side portions on both sides of said center portion in a direction transverse to the travel direction of said input light beams, said plateaus collectively defining a third surface thereon, the distance between said third surface and said recessed surface being less at said center portion than at said side portions.

4. An acoustooptic modulation element as claimed in claim 2, wherein said recessed surface is of triangular shape.

5. An acoustooptic modulation element as claimed in claim 1, further comprising acoustically absorbing means attached to a surface opposite said plateaus for absorbing said acoustic waves.

* * * * *